Jan. 20, 1948.　　R. W. ANDREASSON　　2,434,753
RELIEVING THE TEETH OF CIRCULAR CUTTING ELEMENTS
Filed July 11, 1945　　2 Sheets-Sheet 1

INVENTOR.
Rudolf W. Andreasson.
BY
Harness, Dickey & Pierce.
ATTORNEYS.

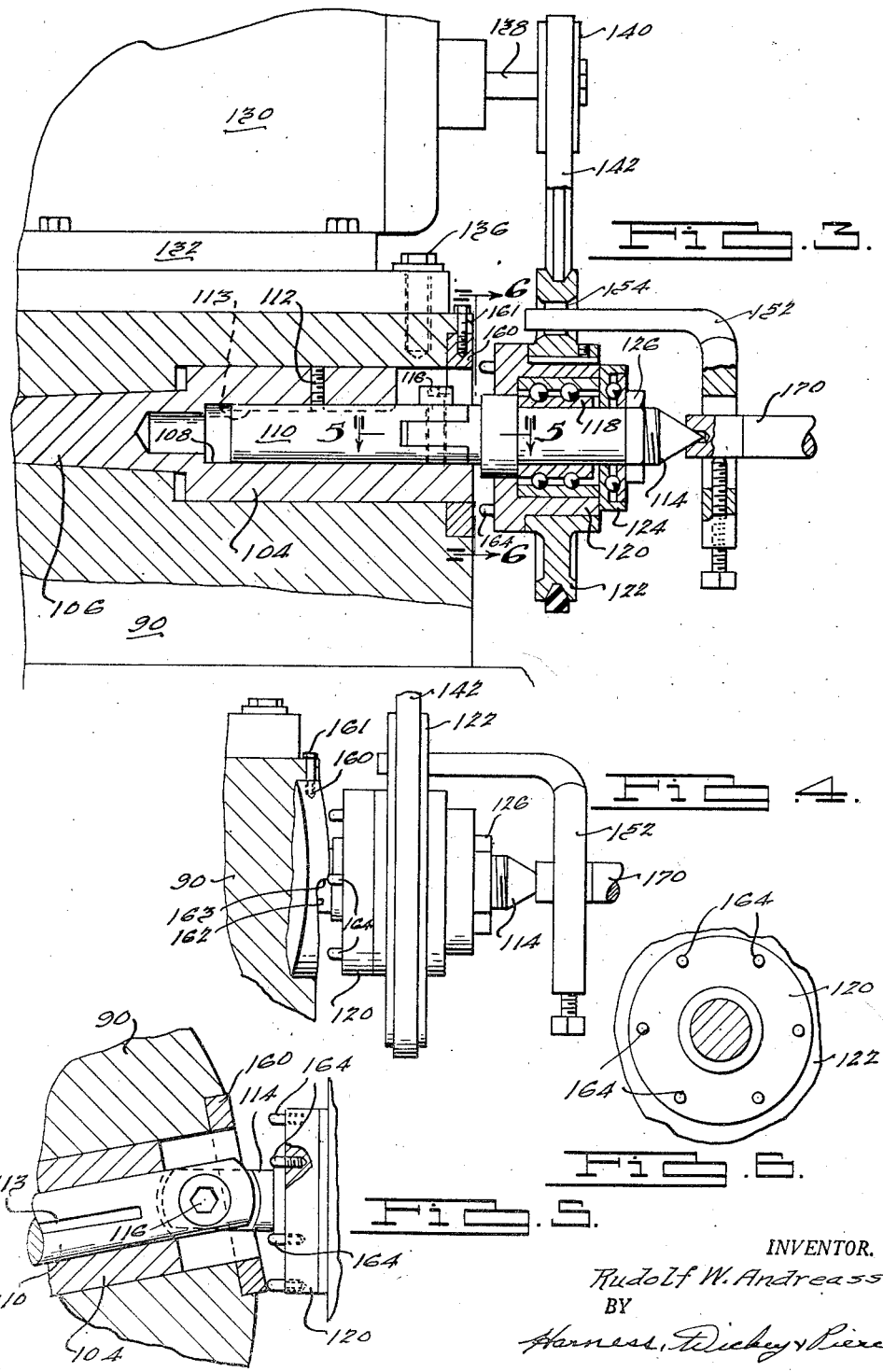

Patented Jan. 20, 1948

2,434,753

UNITED STATES PATENT OFFICE 2,434,753

RELIEVING THE TEETH OF CIRCULAR CUTTING ELEMENTS

Rudolf W. Andreasson, Franklin, Mich.

Application July 11, 1945, Serial No. 604,405

1 Claim. (Cl. 51—232)

This invention relates to the relieving or backing off of the lands back of the cutting edges of the teeth of circular rotating types of cutting elements, such as reamers, milling cutters, or the like, and relates to an improvement in the mechanism shown and claimed in my Letters Patent of the United States No. 2,389,401 issued November 20, 1945, for Improvements in method of relieving the teeth of circular cutting elements and mechanism therefor.

In my co-pending application above referred to means are provided which may be mounted on a conventional type of universal grinder by means of which a cutting tool of the type described, as for instance a reamer, may be mounted between the head stock and tail stock in such a manner that as the reamer is fed longitudinally of the machine in cutting relation with respect to the grinding wheel it is given a bodily reciprocatory movement, independent of the feeding movement, in a direction at an acute angle with respect to the length of its cutting edges and in a direction to impart a lateral displacement thereto toward the grinding wheel, whereby to effect backing off or relieving of the cutting edges. The means provided in my prior application for effecting such reciprocatory movements of the workpiece consists of an axial type of cam fixed to the head stock and having as many high points thereon as there are teeth in the reamer or other workpiece being operated upon, and a pin carried by the corresponding center engageable with the cam whereby to cause the head stock center and the work to be moved axially against the spring pressed tail stock center each time a tooth of the work is brought into operative engagement with the grinding wheel, and to permit the work to be reciprocated in the opposite direction under the force of the spring pressed tail stock center each time contact between the work and the grinding wheel is broken.

In my prior patent it is necessary to provide in each case an axial cam member on the head stock having the same number and disposition of high points as the number and disposition of the teeth on the workpiece to be backed off. This necessitates the provision of a number of different cams each corresponding with the number and disposition of the teeth on different workpieces the teeth of which were to be backed off and each of which cams is relatively costly. In accordance with the present invention a cam corresponding to the cam employed in my prior construction is provided with no high point, or at least a structure which has no more than the equivalent of a single high spot thereon, and the cam follower in this case is provided with as many pins or equivalent projections angularly spaced about its axis for cooperation therewith as there are number and disposition of teeth on the workpiece. Inasmuch as the follower in the present invention simply requires the use of the same number and disposition of pins or the like as there are teeth on the workpiece and inasmuch as such pins may be applied to the follower member in a quick and economical manner, the practice of the present invention results in a more economical and more satisfactory apparatus.

It is, therefore, the principal object of the present invention to provide in an apparatus of the type described a new and improved cam mechanism for effecting axial reciprocation of the cooperating workpiece in timed relation to its rotation; and the provision of a structure of the type described that is simple in construction, economical to build, and effective in operation.

The above being among the objects of the present invention, the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a front elevational view of a grinding machine provided with a work supporting and driving mechanism in accordance with the present invention;

Fig. 3 is an enlarged, fragmentary, partially broken, partially sectioned view taken vertically through the axes of the head stock and the associated parts of the machine shown in the preceding views, as on the line 3—3 of Fig. 2;

Fig. 4 is a fragmentary view taken in the same direction as Fig. 3 but illustrating the cam member and follower in side elevational view and at the same relative angles as disclosed in Fig. 2;

Fig. 5 is a fragmentary sectional view taken on the line 5—5 of Fig. 3; and

Fig. 6 is a fragmentary end view of the cam follower taken as on the line 6—6 of Fig. 3.

It will be understood that the present invention may be employed with any suitable type of machine tool providing for longitudinal feed of the work past a metal removing element of any satisfactory type. The most obvious application is to a grinder and this type of machine tool is, therefore, shown in combination with the present invention by way of illustration.

Figure 1:
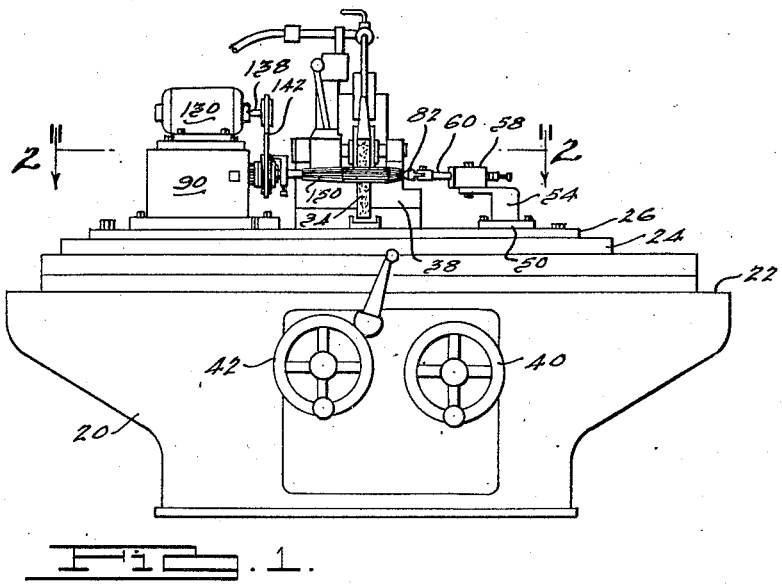
Figure 2:
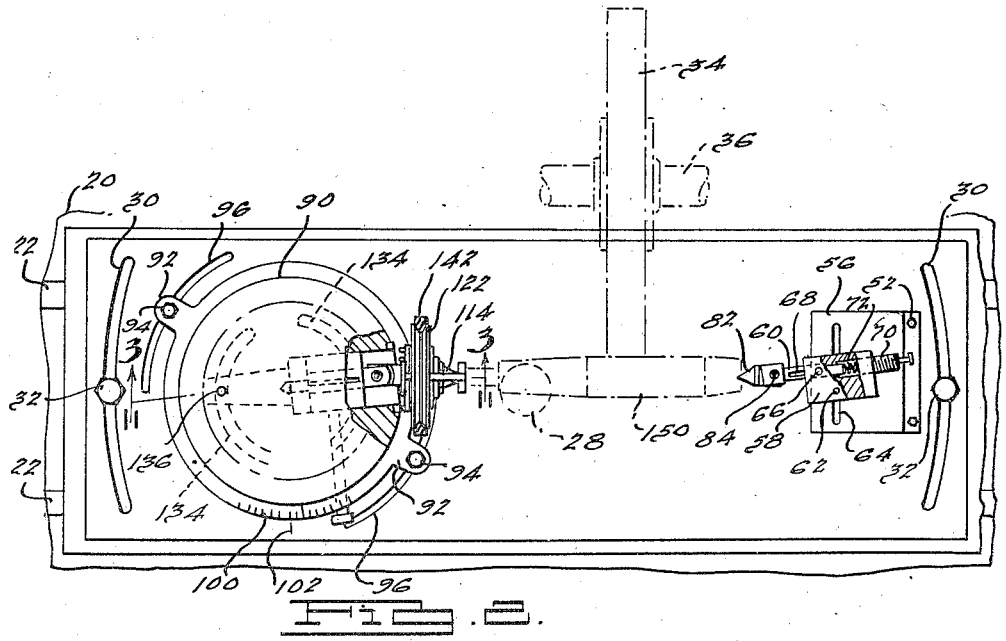
Fig. 2 is an enlarged, fragmentary, partially broken, partially sectioned plan view of the grinding machine shown in Fig. 1 and taken as on the line 2—2 thereof.

Referring now to the accompanying drawing and particularly to Fig. 1, a conventional form of so-called universal cylindrical grinder is shown as including a base 20 provided with ways 22 upon its upper surface upon which a table 24 is reciprocably mounted and driven in a conventional manner. Upon the table 24 is a second table 26 which, as best brought out in Fig. 2, is pivoted to the table 24 by means of a pin or stud 28 for movement in a horizontal plane about the axis of the pin or stud 28. The table 26 is provided with an arcuate slot 30 adjacent each end thereof, struck from the center of the pin 28, through which projects a clamping screw 32 which threads into the table 24 for the purpose of locking the table 26 in adjusted position about the axis of the pin 28 upon the table 24. In Fig. 2 the table 26 is shown as being longitudinally aligned with the table 24, this being the relation of the two tables where a true cylindrical grinding operation is to be effected. If a conical or frusto-conical part is to be ground, then according to conventional practice it is mounted between centers positioned centrally of the table 26 and the table 26 is swung about the pin 28 to bring the line of contact between the conical parts and the grinding wheel into parallelism with respect to the path of movement of the table 24 on the ways 22. A grinding wheel 34 is mounted upon a shaft 36 at the back side of the machine and the axis of the shaft 36 is arranged in parallelism with the ways 22. The shaft 36 is rotatably supported upon a suitable slide 38 which is mounted for movement in a horizontal plane in a direction perpendicular to the length of the ways 22 so as to permit the grinding wheel 34 to be moved toward or away from the work supported on the table 26. A conventional control handle 40 is shown provided for controlling the movement of the slide 38 and consequently the grinding wheel 34 toward and from the work and a conventional hand wheel 42 is provided for effecting movement of the table 24 and, therefore, the table 26 and the work carried by it longitudinally of the ways 22.

In accordance with the present invention the usual driving head or head stock and tail stock conventionally employed on such grinders is replaced by a driving head or head stock and a tail stock of the following description. The tail stock, as best brought out in Fig. 2, comprises a supporting part consisting of a base 50 suitably secured in flat contacting relation with respect to the upper face of the table 26 adjacent one end thereof as by means of screws 52. The base 50 has integrally formed therewith an upstanding pedestal portion 54 which terminates at its upper end in an overhanging plate-like portion 56 having a flat and horizontally directed upper face. Upon the upper face of the portion 56 is received a head 58 in which a center member 60 is reciprocably received for movement in a horizontal plane. The head 58 is mounted upon the upper surface of the portion 56 for bodily shiftable movement in the direction of width of the table 26 and for pivotal movement about a vertical axis in any desired manner, the particular means shown for this purpose consisting of a bolt 62 projecting downwardly vertically through the head 58 and through a transverse slot 64 in the portion 56, the bolt 62 being slidable over the length of the slot 64, serving as a pivot pin between the head 58 and the portion 56 and serving to lock the head 58 in its laterally and pivotally adjusted position upon the portion 56.

The center member 60 is maintained against rotation in the head 58 by means of a guide screw 66 threaded downwardly into the head 58 and into a straight longitudinal groove 68 formed in the exterior surface of the center member 60. A sleeve 70 is threaded into the rear face of the head 58 in axial alignment with the center member 60 and contains a compression spring 72 which acts against the rear end of the center member 60 to constantly urge it outwardly or to the left as viewed in Fig. 2. Adjustment of the pressure of the spring 72 upon the center member 60 may be had by threading the sleeve 70 inwardly or outwardly in the head 58.

The outer end of the center member 60 is bifurcated in a horizontal plane and receives therein the tongue formed centrally on the center point 82, the latter of which is mounted for pivotal movement in a horizontal plane about the end of the center member 60 by means of a screw 84 passing downwardly through the bifurcated end of the center member 60 and through the tongue 80 of the point 82.

Thus with the construction of the tail stock shown and described it will be appreciated that the center member 60 is mounted for reciprocable movement in the head 58, is constantly spring pressed outwardly of the head 58 toward the head stock, that the head 58 and consequently the center member 60 are both shiftable laterally with respect to the length of the table 26 and pivotally adjustable about a vertical axis, and that the center point 82 may be adjusted about the axis of the screw 84 to arrange its axis at any desired angle with respect to the axis of the center member 60 in the head 58 and with respect to the length of the ways 22. It will be understood that the tail stock thus described may be substituted in place of the usual tail stock provided on such grinding machine, or be replaced by such conventional tail stock, in an extremely quick and easy manner usually involving only a matter of minutes.

In place of the usual driving head or head stock provided on such grinding machines, the head stock shown and now described is employed in its place. This head stock includes a head proper indicated at 90, here shown by way of illustration as a cylindrically sectioned casting terminating at its bottom in an outwardly flanged flat face resting directly upon the upper surface of the table 26 at that end thereof opposite the tail stock just described. The head 90 is mounted for pivotal movement about its central vertical axis on the table 26 in any suitable or conventional manner, preferably in the same manner as the usual head stock with which the grinder is provided, the particular means shown comprising a pair of diametrically opposed radially outwardly projecting ears or lugs 92 on the flanged bottom edge thereof through each of which projects a downwardly extending bolt or screw 94 which extends down through a corresponding arcuate slot 96 in the table 26 and with the enlarged lower portion of which the bolt 94 threads into a nut (not shown) slidable in the slot 96. If desired and as indicated in Fig. 2 a circular scale 100 may be provided on the bottom flange of the head 90 and a cooperating point or mark 102 may be provided on the upper surface of the table 26 to enable the rotatable position of the head 90 on the table 26 to be visually determined.

Referring to Fig. 3 it will be noted that a cylindrical holder 104 is mounted in the head 90 with its axis horizontally disposed and arranged at the same height above the upper surface of the table 26 as the center member 60. It is locked against rotation in any suitable manner, the particular means shown in the drawings for this purpose comprising a tapered shank portion 106 thereon received in the complementarily tapered opening in the head 90. The holder 104 is provided with a cylindrical axial bore 108 within which is axially slidably received a center member 110. The center member 110 is maintained against rotation in the holder 104 by means of a guide screw 112 threaded through the side wall of the holder 104 and engaging the longitudinally extending groove 113 in the outer surface of the center member 110. The outer or righthand end of the center member 110 as viewed in Fig. 3 is horizontally bifurcated in a manner similar to the outer end of the center member 60, and similarly receives therein the tail or tongue of a center point 114 which is pivotally connected thereto for movement in a horizontal plane by means of the vertically extending screw 116. As indicated in Fig. 3 the upper portion of the outer end of the holder 104 is cut away to a point inwardly spaced from the outer face of the head 90 to provide working clearance for the head of the screw 116 during axial movement of the center member 110 in the holder 104.

As indicated in Fig. 3 the center point 114 is of substantially greater length than the center point 82 of the tail stock previously described and receives thereon the inner race of a ball bearing assembly 118 which is preferably of the type particularly adapted to take both radial and axial loads. The outer race of the bearing assembly 118 is received within the hub-like member 120 which exteriorly and concentrically supports thereon a pulley 122. A thrust bearing 124 is secured on the outer end of the center point 114 by means of a nut 126 and serves to take the thrust of the cam hereafter described and to lock the inner race of the bearing 118 against axial movement on the center point 114.

A combined electric motor and gear reduction unit indicated generally at 130 is provided with a circular base 132, the outline only of which is shown in Fig. 2 by the dash and dot line, and is mounted for movement about a vertical axis concentric with the vertical pivotal axis of the head 90. As in the case of the head 90 while such pivotal movement of the unit 130 may be accomplished in any suitable or conventional manner, in the particular case shown the base 32 is provided with arcuate slots 134 at diametrically opposite sides thereof, indicated by the dotted lines in Fig. 2, and through which clamping bolts 136 extend and which are threaded into the upper surface of the head 90.

The unit 130 is provided with a drive shaft 138 upon which a pulley 140 is non-rotatably secured and which pulley is connected by a belt 142 with the pulley 122 on the center point 114, thereby to drive the pulley 122 and hub member 120. It will be appreciated that the pivotal mounting of the unit 130 on the head 90 as above described is for the purpose of permitting the plane of the pulley 140 to be adjusted in parallelism with the plane of the pulley 122 as the latter is adjusted about the axis of the screw 116, thereby maintaining the proper driving relation between the two pulleys 122 and 140 when the center point 114 is so adjusted. Inasmuch as the pulley 122 is adapted to drive the work in rotation between the center points 82 and 114 the drive shaft 138 of the unit will rotate at a relatively low rate of rotation, as for instance, by way of illustration only, 25 R. P. M., and that the rate of rotation of the pulley 122 with respect to the pulley 140 may be varied to accommodate different diameters of workpieces, or different characters of workpieces by varying the relative diameters of these pulleys.

The work, here shown in the form of a reamer indicated generally at 150, is mounted between the center points 82 and 114 and is driven from the pulley 122. While any suitable form of driving connection between the reamer 150 and the driving pulley 122 may be employed, a conventional form of dog indicated at 152 and arranged with its tail received in a suitable opening such as 154 in the pulley 122, constitutes a simple and conventional means for effecting such driving movement.

In my prior application above identified in order to effect reciprocable movements of the work during rotation thereof in engagement with the grinding wheel 34 the axially inner face of the hub member 120 was formed to provide an axial type of cam having as many high and low points thereon as the number of teeth on the work to be machined and correspondingly spaced, and a cooperating pin on the head stock 90 engageable therewith. While such construction is fully operative and satisfactory in operation it is relatively more expensive to produce than the cam of the present invention as the cost of such cams is a material item inasmuch as a number of cams are required in my prior construction one corresponding to the number and disposition of the teeth on each workpiece having a number and disposition of teeth different from the other workpieces. In other words the number of high points on the cam in my prior construction must correspond exactly in number and in spacing with the teeth on the workpiece associated therewith. In accordance with the present invention only one cam is required regardless of the number of teeth on the workpiece, this cam being secured to the head stock and in this case the hub member 120, which serves as the cam follower, is provided with as many high points for cooperation therewith and is necessitated by the number of teeth on the particular workpiece to be operated upon. While these high points on the hub member 120 may be formed in any suitable manner, inasmuch as a pin may be satisfactorily employed for each high point and inasmuch as such pins may be applied to a hub member 120 in a quick and economical manner this form of construction is shown in the drawing as being preferable.

Referring to Figs. 3 to 6, inclusive, it will be noted that the cam 160 comprises a ring-like member fitted into a complementary recess formed in the face of the head stock 90 in concentric relation with respect to the holder 104. Its bore is of such size as to freely receive the outer end of the holder 104 therein and it is removably secured in position as by means of screws 161. The particular cam 160 shown is of rectangular cross-sectional configuration and of equal thickness throughout except at one point in its circumference its axially outer face is axially notched as at 162 to provide a shoulder or drop 163. It will be noted that the shoulder or drop 163 is disposed on that side of the cam opposite the grinding wheel 34 and substantially in a horizontal plane passing through the axis of the member 110 and center point member 114. It may be noted that in the particular construction shown the reamer 150 is assumed to have six equally angularly spaced teeth and that where a smaller number of teeth are employed the notch 162 may be either reduced in axial depth or entirely eliminated, depending upon circumstances, and for reasons that will hereinafter be apparent to those skilled in the art.

Assuming in this case as above noted that the reamer 150 is provided with six equally angularly spaced teeth, then six pins 164 are inserted in the axially inner face of the hub member 120. The pins 164 project from the hub member by equal distances and are arranged in a circle concentric with the axis of the center point member 114. The diameter of such circle is such that the circle lies somewhere between the inner and outer diameters of the cam member 60 so that the pins 164 are engageable with the latter when the hub member 120 is pressed axially inwardly. The teeth of the reamer being assumed to be equally angularly disposed about its axis, the pins 164 are similarly equally angularly spaced with respect to each other about the axis of the hub member 120.

In operation the work, here shown as the reamer 150, is positioned between the center members 82 and 114 and the tail stock is so positioned that in conjunction with tightening up the sleeve 70 the spring 72 is compressed to constantly urge the center member 82, work 150 and center member 114 together with the hub member 120 to the left, the movement of these parts in such direction being limited by contact of one or more of the pins 164 with the cam member 160. The head stock 90 and the tail stock are adjusted so that their respective center members 110 and 60 are parallel to each other and at an angle to the line of contact between the grinding wheel 34 and the reamer 150, the amount of the angle depending upon how much relief is desired for the cutting edges of the reamer and the center points 60 and 114 are adjusted so that their axes are aligned. In the case of a workpiece having teeth lying in a cylinder the above adjustments are such as to bring the axes of the center points and work parallel to the ways 22, and in all cases so that the line of contact between the work and the grinding wheel is parallel to such ways. It will also be appreciated that if the center member 114 is adjusted about the axis of the screw 116 to bring its axis into longitudinal alignment with the axis of the member 110, rotation of the hub member 120 and consequently the work 115 will cause no reciprocation of the work as under such circumstances the plane of the free ends of the pins 164 is coincident with the plane of the outer axial face of the cam member 160 except for the notched portion 162 thereof. Therefore, it is only when the member 114 is swung about the axis of the screw 116 to bring its axis out of alignment with the axis of the member 110 that rotation of the hub member 120 will act through the pins 164 to effect reciprocation of the hub member 120 and consequently the work 150. This is best brought out in Fig. 5 from which it will be noted that as the hub member 120 rotates each pin 164 is in turn brought into contact with the cam 160 and the outer face of the cam being skewed with respect to the axis of rotation of the hub member 120 as each pin 164 engages the cam member 160 it will ride along that portion of the face of the cam member 160 adjacent the point of least distance between the axially opposed faces of the cam 160 and the hub member 120 until it strikes the shoulder 163, at which point it will drop down into the notch 162 and permit the hub member 120 to move axially inwardly until the next succeeding pin 164 engages the face of the cam. By this means a reciprocatory movement is imparted to the hub member 120, the center member 114, the work 150 and the tail stock center member 82.

It will also be understood that if the notch 162 is eliminated entirely a reciprocatory movement will still be obtained as each succeeding pin 164 rides over that point on the cam 160 closest to the hub member 120. The reciprocatory movement obtained in the latter manner may be sufficient for many uses but ordinarily it will be preferable to provide the notch 162 or the equivalent so as to permit a fast return of the work on the non-cutting stroke thereof, which will ordinarily be desirable.

From the foregoing it will be understood that in accordance with the present invention but one cam member 160 is required regardless of the difference in number of teeth on different workpieces and all that is required is a change in the hub member 120 to provide the same or its counterpart with the same number and disposition of angularly spaced pins 164 in each case corresponding to the number of cutting edges on the workpiece to be operated upon.

In accordance with the present invention, and in the same manner as in my previous application above identified, in order to translate the above described reciprocatory movement of the work 150 into transverse movement toward and from the grinding wheel 34 in order to back off or grind relief on the land of each cutting tooth of the reamer back of the cutting edge thereof, the tail stock and the driving head are so adjusted on the table 26 that the axes of the center members 60 and 110 are arranged in parallel relation with respect to each other but at an acute angle to the line of contact between the reamer 150 and the grinding wheel 34, and particularly at an acute angle to the line contact between the work and the grinding wheel as viewed in the plane including the axis of the work and the line of contact between the work and the grinding wheel. Whether this angle is offset in one direction or another from such line of contact between the work and the grinding wheel will depend, of course, upon whether the reamer is a right-hand or left-hand reamer and whether it is of a push type or pull type. In the present case and particularly as shown in the drawings the reamer is assumed to be a right-hand, push type reamer having a shank 170 to which the dog 152 is secured and, therefore, the center members 60 and 110 are required to be inclined in the direction illustrated in Fig. 2, that is inclined upwardly to the right as viewed in Fig. 2. The dog 152 is clamped to the shank 170 of the reamer 150 in such position circularly thereof that a tooth of the reamer or work 150 is positioned to engage the grinding wheel 34 at about or slightly after one of the pins 164 makes initial contact with the cam member 160 and so that such pin will drop off the shoulder 163 only after the tooth has moved out of contact with the grinding wheel 34.

The center points 82 and 114 are adjusted about their respective pivotal axes 84 and 116, respectively, so that their longitudinal axes will be parallel with each other and with the axis of the work 150 and all aligned with each other. Under such circumstances it will be understood that as the work 150 rotates between the center members 82 and 114, engagement of successive pins 164 with the cam member 160 will bodily move the work 150 to the right as viewed in Figs. 1 and 2 and due to the angularity of the center members 60 and 110 with respect to the line of contact between the grinding wheel 34 and the work 150, the work 150 will move bodily laterally toward the grinding wheel as it moves longitudinally with respect to it, the work rotating at such time to move the advanced face of the tooth then in contact with the grinding wheel away from the line of contact between the work and the grinding wheel. Consequently the land of each of the teeth of the work is cut away radially of the work to an increasing extent from the cutting edge to the trailing edge thereof. Shortly after each tooth breaks contact with the grinding wheel 34 the then cooperating pin 164 will drop off the shoulder 163, thus permitting the spring 172 to move the work and the cooperating centers to the left as viewed in the drawings until the next succeeding pin engages the face of the cam, this movement moving the work bodily away from the wheel simultaneously with the reverse reciprocatory movement and positioning the next tooth for a like engagement with the grinding wheel during continued rotation of the work.

The relief provided for the cutting edge of the teeth of the work in accordance with the method described herein is, of course, a circular relief which is desired. The amount of relief will, of course, depend upon the amount of reciprocation given to the tool through inter-engagement with the pins 164 with the cam 160 and this amount of reciprocation may be adjusted to suit any desired condition by simply varying the angularity of the center members 60 and 110 with respect to the line of contact between the work and the wheel, the greater the angularity the greater the reciprocation and vice versa. It will, of course, be understood that where the length of the teeth on the work is greater than the width of the face on the grinding wheel the table 24 will be fed continuously back and forth during the above described reciprocatory movement so as to bring the full length of the teeth of the work into contact with the grinding wheel and that as this operation proceeds the grinding wheel will be gradually fed toward the work until the full amount of metal for the relief has been removed therefrom.

Having thus described my invention, what I claim by Letters Patent is:

In a machine of the class described wherein a pair of center members are mounted for reciprocation in parallel but spaced paths at an acute angle with respect to the line of contact between a piece of work supported between them and a metal removing element, each center member is provided with a center point pivotally secured thereto for movement about a vertical axis and said center points are arranged with their axes aligned with each other and the piece of work supported between them, yieldable means constantly urges one center member in the direction of the other thereof, and a driving member is rotatably mounted on the center point of the remaining center member, the combination of the said remaining center member and a fixed smooth disc with respect to which the said remaining center member is axially slidable, and a plurality of axially disposed projecting pins of equal length fixed with respect to that face of the said driving member opposed to the said fixed smooth disc and arranged generally in a circle about the axis of rotation of the said driving member, engagement between the said projecting pins and said fixed smooth disc serving to effect reciprocation of the said center members and work supported therebetween against the opposition of the said yieldable means in one direction and controlling the reciprocation of the said center members and the said work supported therebetween in the opposite direction under the force of the said yielding means.

RUDOLF W. ANDREASSON.

REFERENCES CITED

The following references are of record in the file of this patent:

UNITED STATES PATENTS

| Number | Name | Date |
|---|---|---|
| 1,323,452 | Cogsdill | Dec. 2, 1919 |
| 1,958,105 | Koehler | May 8, 1934 |
| 2,325,364 | Boening | July 27, 1943 |
| 2,389,401 | Andreasson | Nov. 20, 1945 |

FOREIGN PATENTS

| Number | Country | Date |
|---|---|---|
| 471,267 | Great Britain | Sept. 1, 1937 |